United States Patent [19]

Holmes-Farley

[11] Patent Number: 5,102,956
[45] Date of Patent: Apr. 7, 1992

[54] MODIFIED HALOGENATED POLYOLEFIN ADHESIVES

[75] Inventor: Stephen R. Holmes-Farley, Arlington, Mass.

[73] Assignee: Lord Corporation, Erie, Pa.

[21] Appl. No.: 611,218

[22] Filed: Nov. 8, 1990

[51] Int. Cl.$^5$ .................. C08F 267/04; C08F 8/00
[52] U.S. Cl. .................................. 525/285; 525/384
[58] Field of Search ............... 524/325; 525/285, 350, 525/384

[56] References Cited

U.S. PATENT DOCUMENTS

| | | | |
|---|---|---|---|
| 3,211,804 | 10/1965 | Baum et al. | 260/848 |
| 3,620,860 | 11/1971 | Eckardt et al. | 156/247 |
| 4,078,017 | 3/1978 | Nagatoshi et al. | 260/878 R |
| 4,506,056 | 3/1985 | Gaylord | 524/445 |
| 4,725,506 | 2/1988 | Nagano | 428/516 |
| 4,745,147 | 5/1988 | Honsberg | 524/386 |
| 4,822,688 | 4/1989 | Nogues | 428/458 |

FOREIGN PATENT DOCUMENTS 0187171 7/1985 European Pat. Off. .

OTHER PUBLICATIONS

Eastman Chemical Products, Inc., "Modified Chlorinated Polyolefin", Publication No. X-294, Mar. 1989.

Fujimoto, "Properties and Applications of Chlorinated Polypropylene", *Paint and Resin*, Feb. 1986, pp. 36–40.

Van Meesche & Radar, "Adhesion of Elastomeric Alloy Thermoplastic Vulcanizates", *Elastomerics*, Sep. 1987, pp. 21–25.

VanderKooi & Goettler, "Bonding Olefinic Thermoplastic Elastomers", *Rubber World*, vol. 192, No. 2, 1985.

Bratawidjaja et al., "Adhesive Property of Polypropylene Modified with Maleic Anhydride by Extrusion Molding", Journal of Applied Polymer Science, vol. 37, 1141–1145 (1989).

*Primary Examiner*—Joseph L. Schofer
*Assistant Examiner*—Wu C. Cheng
*Attorney, Agent, or Firm*—W. Graham Buie

[57] ABSTRACT

An adhesive composition useful for bonding thermoplastic elastomers to substrates such as metal that contains a halogenated polyolefin that has been chemically modified to contain a polyhydroxylic aromatic compound and/or a sulfur-containing compound. The modified polyolefin is preferably prepared by first reacting the polyolefin with an acid anhydride and then reacting the anhydride-modified polyolefin with the polyhydroxylic aromatic compound and/or the sulfur-containing compound.

20 Claims, No Drawings

MODIFIED HALOGENATED POLYOLEFIN ADHESIVES

FIELD OF THE INVENTION

The present invention is concerned with a novel, chemically modified polymeric material that can be used to provide excellent adhesion between injection molded polyolefinic thermoplastic elastomers and metal substrates onto which the thermoplastic elastomer is molded. More particularly, the invention relates to halogenated polyolefins, such as chlorinated polypropylene, which have been modified to contain certain polyhydroxylic aromatic compounds and/or certain sulfur-containing compounds.

BACKGROUND OF THE INVENTION

In general, polyolefinic thermoplastic elastomers, such as those where polypropylene is the matrix and cured rubber forms a discrete second phase (e.g., SANTOPRENE supplied by Monsanto), adhere poorly to metal, glass, and other substrates. When these types of elastomers are molded against a substrate, such as a metal insert in injection molding, an adhesive must first be applied to the substrate to ensure sufficient adhesion between the elastomer and the substrate.

Chlorinated polyolefins and modified chlorinated polyolefins are well known to provide adhesion to polyolefinic materials, such as polyolefinic thermoplastic elastomers and polypropylene (Eastman Chemicals Publication No. GN-360-C, August, 1988; Eastman Chemicals Publication No. X-294, March, 1989). The influence of the amount of chlorine, the molecular weight of the polymer, its melting point, and other variables on the efficacy of adhesion between chlorinated polypropylene and polyolefinic substrates has been reported by Fujimoto (F. Fujimoto, *Paint and Resin*, February, 1986, p. 36.). Chlorinated polyolefins are, for example, the primary ingredient in primers used to bond to polyolefins (Renout, European Patent Application 0 187 171, July 1986).

Chlorinated polyolefins do not, however, strongly adhere to other materials such as metal. Eckhardt (U.S. Pat. No. 3,620,860) describes chlorinated polymers of ethylene that are claimed to be effective temporary bonding agents for metals, but the substrates bonded by those chlorinated polymers are readily separated from each other. In order to attain adhesion between compositions containing chlorinated polyolefins and other materials, the chlorinated polyolefins must typically be mixed with other ingredients. Van Meesche and Radar (A. Van Meesche and C. Radar, *Elastomerics*, September, 1987, p. 21) describe compositions that are mixtures of modified polyolefins (chlorinated polyolefins) and polyurethane resins. These compositions are reported to provide adhesion to a wide variety of other substrates. These compositions have several drawbacks, including insufficient adhesion and environmental resistance.

Modifications of polyolefins in order to promote adhesion to metal, glass, and other substrates are also well known in the art. Baum (U.S. Pat. No. 3,211,804) describes the modification of polyolefins with polymethylolated phenolic material containing one or more phenolic nuclei and having substituted on the phenolic nuclei at least two methylol groups (—CH$_2$OH). Baum further describes the adhesional benefits of carboxyl and hydroxyl groups attached to the polyolefin.

Van Meesche and Radar (A. Van Meesche and C. Radar, *Elastomerics*, September, 1987, p. 21) report that carboxylated polypropylene is an effective adhesive for bonding polyolefinic thermoplastic elastomers to metal, but it has the major disadvantage of a high activation temperature of ~200° C. Van der Kooi and Goettler (J. P. Van der Kooi and L. A. Goettler, *Rubber World*, Vol. 192, No. 2, 1985, p. 38) describe several modified polyolefins used to bond polyolefinic thermoplastic elastomers to metal, including carboxylated polyolefins. These polymers also have the disadvantage of a high activation temperature.

Nogues (U.S. Pat. No. 4,822,688) describes the use of non-halogenated polypropylene that has been grafted with maleic anhydride in adhesive formulations. Nogues further describes the reaction of such materials with polyols and polyamines. Bratawidjaja et al (Bratawidjaja, A. S.; Gitopadmoyo, I.; Watanabe, Y.; Hatakeyama, T. *Journal of Applied Polymer Science*, Vol. 37, 1989, p. 1141) also describe the relationship between the extent of grafting of maleic anhydride onto polypropylene and its adhesive strength to aluminum. These compositions have disadvantages that include high activation temperatures and insolubility in most solvents, precluding use in a solvent borne adhesive system.

Other methods of bonding polyolefins to substrates typically involve surface pretreatment of the polyolefin prior to bonding. These technologies involve such processes as plasma treatment, corona discharge, and chemical etching as with chromic acid. These technologies are widely known and practiced but have several disadvantages. The foremost of these disadvantages, with respect to bonding during molding of polyolefins such as polyolefinic thermoplastic elastomers, is that the polyolefin must have a solid surface to pretreat. When molding these materials onto a substrate, as in injection molding onto a metal insert, there is no polyolefin surface that is readily modified prior to adhesion. Thus the process of injection or compression molding effectively precludes surface pretreatment of the polyolefin to promote adhesion either to the substrate or to an adhesive already applied to the substrate.

Adhesives, such as described above, currently used for bonding polyolefinic thermoplastic elastomers to metal substrates have many drawbacks that are eliminated by the present invention. These drawbacks include the requirement for a primer applied to the substrate prior to the adhesive, poor shelf stability, poor environmental resistance, poor strength, inconvenient processing requirements, and toxic and/or flammable solvents.

SUMMARY OF THE INVENTION

The present invention relates to a chemical modification of a halogenated polyolefin that permits surprisingly effective adhesion to substrates such as metal without decreasing the adhesion to polyolefinic thermoplastic elastomers. The present invention involves applications where the modified halogenated polyolefin is used either by itself or in formulations with other adhesive ingredients, such as polymers and adhesion promoters, known to those skilled in the art.

The present chemical modification involves the attachment of certain chemical species to the halogenated polyolefin (usually chlorinated and/or brominated polypropylene) in quantities sufficient to provide significant adhesion to a substrate of choice while not interfering with adhesion to polyolefinic thermoplastic elastomers. Specifically, the chemical modification involves first grafting an acid anhydride onto the halogenated polyolefin in a known manner using an appropriate catalyst. The acid anhydride-modified polymer is then reacted with certain polyhydroxylic aromatic compounds and/or certain sulfur-containing compounds that greatly increase its adhesion to a substrate of choice such as metal. Attachment of these moieties to the halogenated polyolefin through reaction with the acid anhydride results in a material that effectively adheres both polyolefinic thermoplastic elastomers and metal substrates. Neither halogenated polyolefins nor maleic anhydride-modified halogenated polyolefins provide the adhesive properties of the chemically modified halogenated polyolefins of this invention.

The nature of the group reacted with the grafted acid anhydride is critical to the present invention. It has presently been discovered that certain polyhydroxylic aromatic compounds and certain sulfur-containing compounds and combinations thereof are effective in generating significant adhesion between polyolefinic thermoplastic elastomers and metal substrates.

DETAILED DESCRIPTION OF THE INVENTION

The present invention comprises a halogenated polyolefin to which has been attached certain adhesion promoting agents. The adhesion promoting agents comprise certain polyhydroxylic aromatic compounds and/or certain sulfur-containing compounds and are chemically attached to the halogenated polyolefin by first reacting the polyolefin with an acid anhydride and then reacting the resulting product with the appropriate one or more adhesion promoting agents. Simple admixture of these agents is not sufficient to promote adhesion; they must be chemically reacted to achieve optimum results.

The halogenated polyolefin can essentially be any natural or synthetic halogenated polyolefin elastomer. Halogenated polyolefins and their preparation are well known to those skilled in the art. The halogens employed in the halogenated polyolefinic elastomer are typically chlorine or bromine, although fluorine can also be used. Mixtures of halogens can also be employed in which case the halogen-containing polyolefinic elastomer will have more than one type of halogen substituted thereon. The halogenated polyolefin typically has a halogen content ranging from about 10 to 70, preferably from about 20 to 45, percent by weight.

Polyolefins which can be halogenated for use in the invention include, but are not limited to, polyethylene, polypropylene, ethylene-propylene copolymers, ethylene-acrylic acid copolymers, ethylene-propylene-acrylic acid terpolymers, ethylene-propylene-diene terpolymers, ethylene-vinyl acetate copolymer, polybutene, and polystyrene. Representative halogenated polyolefins include chlorinated natural rubber, chlorine- and bromine-containing synthetic rubbers including polychloroprene, chlorinated polychloroprene, chlorinated polybutadiene, hexachloropentadiene, chlorinated butadiene styrene copolymers, chlorinated ethylene propylene copolymers and ethylene/propylene/nonconjugated diene terpolymers, chlorinated polyethylene, chlorinated polypropylene, chlorosulfonated polyethylene, brominated poly(2,3-dichloro-1,3-butadiene), copolymers of α-chloroacrylonitrile and 2,3-dichloro-1,3-butadiene, chlorinated poly(vinyl chloride), and the like, including mixtures of such halogen-containing elastomers. Thus substantially any of the known halogen-containing derivatives of natural and synthetic elastomers can be employed in the practice of this invention, including mixtures of such elastomers. At the present time, chlorinated isotactic polypropylene (26% chlorine by weight) which results in a viscosity of 50–500 cps when dissolved in toluene (10% by weight), chlorinated polyethylene (25% chlorine by weight), and brominated chlorinated polyolefins, constitute preferred halogenated polyolefins for use in the present invention. The halogenated polyolefin is normally utilized in an amount from about 10 to about 99 percent by weight, preferably from about 30 to about 70 percent by weight of the total amount of adhesive precursor ingredients. Total amount of adhesive precursor ingredients herein refers to the total amount of halogenated polyolefin, acid anhydride, catalyst (if utilized), polyhydroxy aromatic compound and sulfur-containing compound utilized to prepare the present adhesive compositions.

The acid anyhdride utilized to prepare the halogenated polyolefin for further reaction with the present adhesion promoters can essentially be any compound bearing at least one double bond, which is active in radical polymerization, and at least one five-centred cyclic acid anhydride group.

By way of illustration, the grafting anhydrides can be maleic, citraconic, 2-methylmaleic, 2-chloromaleic, 2-carbomethoxymaleic, 2,3-dimethylmaleic, 2,3-dichloromaleic, 2,3-dicarbomethoxymaleic, bicyclo[2.2.1]hept-5-3n3-2,3-dicarboxylic, 4-methylcyclohex-4-ene-1,2-dicarboxylic anhydride, or the like. The presently preferred acid anhydride is maleic anhydride. The acid anhydride is utilized in an amount ranging from about 0.1 to 50, preferably about 1 to 10 percent by weight of the total amount of adhesive precursor ingredients.

The polyhydroxylic aromatic compounds of the invention which are useful for imparting exceptional adhesion ability to the acid anhydride-modified polyolefins can essentially be any compound containing an aromatic moiety to which is attached at least two OH groups. The polyhydroxylic aromatic compound typically contains from 6 to 24, preferably 6 to 14, carbon atoms and can contain multiple aromatic moieties, including fused aromatic moieties. Typical polyhydroxylic aromatic compounds include quinalizarin; 2,6-bis(hydroxymethyl)-p-cresol; alizarin; alizarin red S; acid alizarin voilet N; quercetin; fisetin; pyrogallol; pyrocatechol voilet; aurintricarboxylic acid; apigenin; naringenin; purpurogallin; and 2,4,5-trihydroxypyrimidine; and combinations thereof; with quinalizarin being particularly preferred. The polyhydroxylic aromatic compounds are typically employed in an amount ranging from about 0.1 to 50, preferably from about 5 to 30, percent by weight of the total amount of adhesive precursor ingredients.

The sulfur-containing compounds which are also useful for imparting adhesive properties to the modified halogenated polyolefins can be any compound which contains at least one sulfur atom and one active hydrogen-containing group (such as —OH, —SH, or —NH$_2$). Typical sulfur compounds include 3-aminorhodanine; 1,5-pentanedithiol; p-benzenedithiol; 2-mercaptoethanol; tioxolone; 6-methyl-2-thiouracil; 2-mercaptobenzothiozole; 2-mercaptoimidizole; 2-mercaptothiazoline; 2-mercaptopyridinol; 2-hydroxyethylsulfide; 2-hydroxyethyl-disulfide; 2-aminoethanethiol; p-mercaptoaniline; 2-aminoethyl-disulfide; and combinations thereof with 3-aminorhodanine and 1,5-pentanedithiol being preferred. The sulfur-containing compounds are typically utilized in an amount ranging from about 0.1 to 50, preferably from about 5 to 30, percent by weight of the total amount of adhesive precursor ingredients.

One or more polyhydroxylic aromatic compounds may also be utilized in combination with one or more sulfur-containing compounds to impart adhesive properties to the modified polyolefins of the present invention. The polyhydroxylic aromatic compounds and sulfur-containing compounds of the invention are known compounds available to those skilled in the art.

The chemical modification is a two-step process. The first step is attachment of the acid anhydride to the halogenated polyolefin using conventional techniques which may or may not employ a catalyst or an initiator. A preferred technique for attaching the acid anhydride to the halogenated polyolefin involves utilizing an organic peroxide or other free radical initiator such as 2,2'-azo-bis-isobutyronitrile, dimethyl 2,2'-azoisobutyrate, phenyl-azo-triphenylmethane or t-butylperbenzoate as an initiator. The organic peroxide or other initiator initiates a free radical site on the halogenated polyolefin for reaction with the acid anhydride as is known in the art. Organic peroxides are preferred initiators and typical organic peroxides include benzoyl peroxide, t-butyl-peroxide, dicumylperoxide, acetyl peroxide, hydrogen peroxide, and t-amyl peroxide, with benzoyl peroxide being preferred. The organic peroxide is typically utilized in an amount ranging from about 0.01 to 5, preferably from about 0.5 to 3, percent by weight of the total amount of adhesive precursor ingredients.

The reaction of the halogenated polyolefin and the acid anhydride in the presence of an organic peroxide is preferably carried out in the presence of a solvent such as benzene or chlorobenzene, with chlorobenzene being the preferred solvent. The halogenated polyolefin, solvent, and acid anhydride are typically combined and brought to reflux, after which the organic peroxide is added and the mixture refluxed from about 40 minutes to 1.5 hours. The resulting material has acid anhydride moieties actually grafted onto the chlorinated polypropylene chain. If maleic anhydride units are simply mixed with the chlorinated polypropylene, but not chemically attached with an initiator, the results are poor.

Active sites may also be generated on the polyolefin through the use of diazo-type initiators or with electromagnetic treatment. The polyolefin may be preactivated independently of the acid anhydride and thereafter reacted with the anhydride or anhydride modification may be carried out simultaneously as described in U.S. Pat. Nos. 2,970,129 and 3,414,551, which are incorporated herein by reference.

The second step involves attachment of the present adhesion promoting moieties to the anhydride-modified halogenated polyolefin. These moieties are reacted with the anhydride groups on the halogenated polyolefin. It is not necessary that all, or even a majority of the maleic anhydride units be reacted. It is often sufficient that only a small proportion (1-20%) of the maleic anhydride units be reacted with the adhesion promoting moiety. The reaction between the anhydride-modified polyolefin and the adhesion promoter is typically carried out by simply mixing the polyolefin and adhesion promoter in a suitable solvent. Typical solvents include benzene, toluene, chlorobenzene, chloroform and methylene chloride, with chlorobenzene being preferred. The mixture is then typically brought to reflux for a period of time ranging from 40 minutes to 1.5 hours in order to ensure sufficient reaction.

The reacted polymer can optionally be purified in any of the many ways known in the art. These include repeated precipitation, followed by dissolution, and extraction with a Soxhlet-type apparatus.

The resulting material can be dissolved in an appropriate solvent, such as toluene, xylene, or chlorobenzene for application. Alternatively, it can be dispersed in water using appropriate surfactants known to those skilled in the art. The material can also be used in solid form as a powder coating or a hot applied adhesive, eliminating the need for solvent.

The resulting polymeric material of the present invention can be used singly as an adhesive or in conjunction with other adhesive ingredients or primers known to those skilled in the art. Optional ingredients include, but are not limited to, fillers, adhesion promoters such as silanes and zircoaluminates, other polymers, plasticizers, and inhibitors.

The modified polyolefins of the invention are preferably dissolved in a solvent and applied to a metal substrate by dipping, brushing, spraying, or the like, so as to create one or more coats of the formulation. The coated substrate should be allowed to dry for a period of time ranging from 1 hour to 24 hours. Prior to application of the thermoplastic elastomer by injection molding, the coated substrate may optionally be preheated to a temperature between about 100° C. and 150° C. for between about 15 seconds and 10 minutes.

When bonding thermoplastic elastomers to various substrates, the thermoplastic elastomer is typically applied to the surface of the substrate from an injection molding device according to techniques well known in the art. A thermoplastic elastomer applied from such a molding device typically has an initial temperature of from about 300° F. to about 450° F. and the coated substrate and thermoplastic elastomer are brought together under a pressure of from about 500 to about 10,000 psi. After the thermoplastic elastomer and substrate are brought together, the elastomersubstrate assembly is allowed to cool for a period of from about 1 hour to about 24 hours. The thermoplastic elastomer and the substrate may also be bonded according to other methods such as assembly bonding or extrusion.

Although the adhesives of the present invention are preferred for bonding thermoplastic elastomers to metal, the present adhesive compositions may be applied as an adhesive, primer or coating to any surface or substrate capable of receiving the adhesive. The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, Buna-S, Buna-N, butyl rubber, brominated butyl rubber, nitrile rubber, and the like. The material is most preferably a thermoplastic elastomer such as the thermoplastic elastomers sold under the tradenames SANTOPRENE and ALCRYN by Monsanto and DuPont, respectively. The surface to which the material is bonded can be any surface capable of receiving the adhesive and is preferably a metal selected from any of the common structural metals such as iron, steel (including stainless steel), lead, aluminum, copper, brass, bronze, Monel metal, nickel, zinc, and the like.

The following examples are provided for illustration purposes only and are not intended to limit the scope of the invention.

EXAMPLE 1

Chlorinated polypropylene (10 g; 26% Cl by weight) is dissolved in 50 mL of chlorobenzene. Maleic anhydride (0.5 g) is added and the solution brought to reflux. Benzoyl peroxide (0.2 g) is added and the solution refluxed for 1 hr. The solution is cooled to room temperature, 3 g of quinalizarin is added, and the solution heated to reflux for 1 hr. The solution is cooled to room temperature, 200 mL of chlorobenzene is added, excess solid is filtered off, and the liquid poured into an excess of methanol (~2.5 L) to precipitate the desired product. This material is optionally purified by dissolving in chlorobenzene (100 mL) and precipitation in methanol (2.5 L) repeated several times. The solid material (referred to as CPP/Quinalizarin) is permitted to air dry for a few hours and then tested as desired.

The CPP/Quinalizarin is dissolved in toluene (~20% by weight) and then applied directly to the substrate according to ASTM D429B (1"×2.36" steel alloy 1010 coupons). The substrates are allowed to air dry for at least 1 hr. and are then injection molded to a polyolefinic thermoplastic elastomer (SANTOPRENE 101-55).

The elastomer-metal joints are formed by placing the adhesive-coated steel substrate into a mold and injection molding the elastomer onto the steel. Samples are molded with the mold temperature at 175° F. The joints are cooled and then tested in a 45° peel geometry acording to ASTM D429B.

Peel strength (lb/in.) and percent rubber failure are calculated and the results are shown below in Table 1. A high percentage of rubber failure indicates a strong adhesive bond since rubber failure indicates that the bond was stronger than the rubber itself. Data was also obtained for coupons that were immersed in water for one week, and the results of the water test are set forth in Table 2.

TABLE 1

| | Initial Peel Strength | |
|---|---|---|
| Adhesive | Strength (lb/in) | % Rubber Failure |
| No Preheating CPP/Quinalizarin | 37 | 85% |
| Preheating* CPP/Quinalizarin | 37 | 80% |
| Two Coats/CPP/Quin. | 37 | 96% |

*Preheated substrates were heated for 5 min at 130° C. immediately prior to insertion in the mold.

TABLE 2

| Peel Strength After 1 Week in Water Under Stress | | |
|---|---|---|
| Adhesive | Strength (lb/in) | % Rubber Failure |
| No Preheating CPP/Quinalizarin | 35 | 60% |
| Preheating* CPP/Quinalizarin | 35 | 20-60% |

*Preheated substrates were heated for 5 min at 130° C. immediately prior to insertion in the mold.

EXAMPLE 2

The CPP/Quinalizarin produced in Example 1 is tested as in Example 1 using SANTOPRENE 101-64 as the polyolefinic thermoplastic elastomer and grit-blasted steel as the substrate according to ASTM D429B (the mold is at room temperature during molding and a 45° peel geometry is used). The results are shown in Table 3 for initial peel strengths and Table 4 for peel strengths after exposure to water for one week under stress.

TABLE 3

| | Initial Peel Strength* | |
|---|---|---|
| Adhesive | Strength (lb/in) | % Rubber Failure |
| CPP/Quinalizarin | 76 | 81% |

*Preheated substrates were heated for 30 sec at 290° F. immediately prior to insertion in the mold.

TABLE 4

| Peel Strength After 1 Week in Water Under Stress* | | |
|---|---|---|
| Adhesive | Strength (lb/in) | % Rubber Failure |
| CPP/Quinalizarin | 74 | 75% |

*Preheated substrates were heated for 30 sec at 290° F. immediately prior to insertion in the mold.

EXAMPLE 3

The material of Example 1 is made using 3-aminorhodanine instead of quinalizarin (CPP/AR). Joints made as in Example 1 (mold temperature=175° F.; no preheating of the substrate prior to molding) had initial peel strength of 35 lb/in and a failure mode of 25% rubber tearing.

EXAMPLE 4

The material of Example 1 is made using 2,6-bis(hydroxymethyl)-p-cresol instead of quinalizarin (CPP/BHMC). Solid CPP/BHMC is obtained by eliminating the final step involving dissolution of the product in toluene, and the solid is used to make joints by applying powdered CPP/BHMC to the steel substrate and melting the powder into the steel (mold temperature=175° F.; substrate is preheated for 30 sec at 290° F. prior to molding). These joints have initial peel strength of 37 lb/in and a failure mode of 45% rubber tear.

EXAMPLE 5

Chlorinated polypropylene is reacted with maleic anhydride and 1,5-pentanedithiol as in Example 1 with the dithiol substituting for quinalizarin. The product, referred to as CPP/Pentanedithiol, is tested as in Example 1 with the substrate being preheated for 5 minutes at 130° C. immediately prior to insertion in the mold. The resulting joint exhibits an initial peel strength of 36 lb/in. and a failure mode of 89% rubber tear.

As can be seen from the data in the above examples, the modified halogenated polyolefins of the present invention provide for moderate to excellent adhesive bonds between thermoplastic elastomers and substrates such as metal. In light of the difficulty in bonding thermoplastic elastomers in general, even a 25% rubber failure is deemed to be a successful thermoplastic-metal bond.

What is claimed is:

1. An adhesive composition comprising a reaction product prepared by grafting a halogenated polyolefin with an acid anhydride and then reacting the anhydride-grafted polyolefin with at least one compound selected from a polyhydroxylic aromatic compound and a sulfur-containing compound.

2. An adhesive composition according to claim 1 wherein the halogenated polyolefin is selected from the group consisting of chlorinated polypropylene, chlorinated polyethylene, and brominated chlorinated polyolefins.

3. An adhesive composition according to claim 2 wherein the halogenated polyolefin is chlorinated isotactic polypropylene.

4. An adhesive composition according to claim 1 wherein the polyhydroxylic aromatic compound is selected from the group consisting of quinalizarin, 2,6-bis(hydroxymethyl)-p-cresol, alizarin, and alizarin red S.

5. An adhesive composition according to claim 4 wherein the polyhydroxylic aromatic compound is quinalizarin.

6. An adhesive composition according to claim 1 wherein the sulfur-containing compound is selected from the group consisting of 3-aminorhodanine, 1,5-pentanedithiol, and p-benzenedithiol.

7. An adhesive composition according to claim 6 wherein the sulfur-containing compound is 1,5-pentanedithiol.

8. An adhesive composition according to claim 1 wherein the acid anhydride is selected from the group consisting of maleic anhydride, citraconic anhydride, and 2-methylmaleic anhydride.

9. An adhesive composition according to claim 8 wherein the acid anhydride is maleic anhydride.

10. An adhesive composition comprising the reaction product of:
A) the reaction product of from about 10 to 99 percent by weight of a halogenated polyolefin and from about 0.1 to 50 percent by weight of an acid anhydride; and
B) from about 0.1 to 50 percent by weight of at least one compound selected from a polyhydroxylic aromatic compound and a sulfur-containing compound.

11. An adhesive composition according to claim 10 wherein the halogenated polyolefin is present in an amount from about 30 to 70 percent by weight; the acid anhydride is present in an amount from about 1 to 10 percent by weight; and the polyhydroxylic aromatic compound and/or the sulfur-containing compound is present in an amount from about 5 to 30 percent by weight; said percents by weight being based on the total amount of adhesive precursor ingredients.

12. An adhesive composition according to claim 10 wherein the halogenated polyolefin is selected from the group consisting of chlorinated polypropylene, chlorinated polyethylene, and brominated chlorinated polyolefins.

13. An adhesive composition according to claim 12 wherein the halogenated polyolefin is chlorinated isotactic polypropylene.

14. An adhesive composition according to claim 10 wherein the polyhydroxylic aromatic compound is selected from the group consisting of quinalizarin, 2,6-bis(hydroxymethyl)-p-cresol, alizarin, and alizarin red S.

15. An adhesive composition according to claim 14 wherein the polyhydroxylic aromatic compound is quinalizarin.

16. An adhesive composition according to claim 10 wherein the sulfur-containing compound is selected from the group consisting of 3-aminorhodanine, 1,5-pentanedithiol, and p-benzenedithiol.

17. An adhesive composition according to claim 16 wherein the sulfur-containing compound is 1,5-pentanedithiol.

18. An adhesive composition according to claim 10 wherein the acid anhydride is selected from the group consisting of maleic anhydride, citraconic anhydride, and 2-methylmaleic anhydride.

19. An adhesive composition according to claim 18 wherein the acid anhydride is maleic anhydride.

20. An adhesive composition comprising the reaction product of:
A) the reaction product of from about 30 to 70 percent by weight of chlorinated polypropylene and from about 1 to 10 percent by weight of maleic anhydride; and
B) from about 5 to 30 percent by weight of quinalizarin.

* * * * *